United States Patent
Kim et al.

(10) Patent No.: US 9,070,947 B2
(45) Date of Patent: Jun. 30, 2015

(54) POUCH TYPE SECONDARY BATTERY AND METHOD FOR MANUFACTURING THE SAME

(71) Applicant: SK INNOVATION CO., LTD., Seoul (KR)

(72) Inventors: Gyusik Kim, Cheongwon-gun (KR); Jonha Lee, Cheonan-si (KR); Jaeman Seo, Daejeon (KR)

(73) Assignee: SK INNOVATION CO., LTD. (KR)

( * ) Notice: Subject to any disclaimer, the term of this patent is extended or adjusted under 35 U.S.C. 154(b) by 224 days.

(21) Appl. No.: 13/940,549

(22) Filed: Jul. 12, 2013

(65) Prior Publication Data

US 2013/0298388 A1    Nov. 14, 2013

Related U.S. Application Data

(62) Division of application No. 13/524,299, filed on Jun. 15, 2012.

(30) Foreign Application Priority Data

Jun. 16, 2011    (KR) ........................ 10-2011-0058234

(51) Int. Cl.
*H01M 10/04*    (2006.01)
*H01M 2/02*    (2006.01)
*H01M 10/05*    (2010.01)

(52) U.S. Cl.
CPC ............ *H01M 10/04* (2013.01); *Y10T 29/4911* (2015.01); *H01M 2/02* (2013.01); *H01M 10/05* (2013.01)

(58) Field of Classification Search
CPC ....... H01M 10/04; H01M 10/05; H01M 2/02; Y10T 29/4911
USPC ........... 429/65, 151, 139, 171, 172, 173, 174, 429/180, 181, 184, 185; 29/623.2; 383/107–108
See application file for complete search history.

(56) References Cited

U.S. PATENT DOCUMENTS

2004/0121231 A1*    6/2004    Kim ............................. 429/181
2007/0264535 A1    11/2007    Lee et al.
2008/0311469 A1*    12/2008    Kim ............................. 429/185

FOREIGN PATENT DOCUMENTS

| JP | 2004055154 | 2/2004 |
|---|---|---|
| KR | 1020080005627 | 1/2008 |
| KR | 1020100003557 | 1/2010 |

* cited by examiner

*Primary Examiner* — Milton I Cano
*Assistant Examiner* — Ling R Zeng
(74) *Attorney, Agent, or Firm* — Cantor Colburn LLP

(57) ABSTRACT

Provided are a pouch type secondary battery capable of preventing corrosion of a metal layer due to exposure of the metal layer to the outside at a distal end of a case thereof, and a method for manufacturing the same.

4 Claims, 3 Drawing Sheets

POUCH TYPE SECONDARY BATTERY AND METHOD FOR MANUFACTURING THE SAME

CROSS-REFERENCE TO RELATED APPLICATIONS

This application is a divisional of U.S. application Ser. No. 13/524,299, filed on Jun. 15, 2012, which claims priority under 35 U.S.C. §119 to Korean Patent Application No. 10-2011-0058234, filed on Jun. 16, 2011, in the Korean Intellectual Property Office, the disclosure of which is incorporated herein by reference in its entirety.

TECHNICAL FIELD

The following disclosure relates to a pouch type secondary battery and a method for manufacturing the same, and more particularly, to a pouch type secondary battery capable of preventing corrosion of a metal layer to exposure of the metal layer to the outside at a distal end of a case thereof, and a method for manufacturing the same.

BACKGROUND

Generally, research into a secondary battery capable of being charged and discharged unlike a primary battery has been actively conducted in accordance with the development of state-of-the-art fields such as a digital camera, a cellular phone, a laptop computer, a hybrid automobile, and the like. An example of the secondary battery includes a nickel-cadmium battery, a nickel-metal hydride battery, a nickel-hydrogen battery, and a lithium secondary battery. Among them, the lithium secondary battery, which has operating voltage of 3.6 V or more, is used as a power supply of a portable electronic device or a plurality of lithium secondary batteries are connected in series with each other to thereby be used for a high output hybrid automobile. Since this lithium secondary battery has operating voltage three times higher than that of the nickel-cadmium battery or the nickel-metal hydride battery and is more excellent in view of energy density characteristics per unit weight than the nickel-cadmium battery or the nickel-metal hydride battery, the use of the lithium secondary battery has rapidly increased.

The lithium secondary battery may be manufactured in various types. As a typical type of the lithium secondary battery, there are a cylindrical type and a prismatic type that are mainly used for a lithium ion battery. A lithium polymer battery that has been recently spotlighted is manufactured in a pouch type having flexibility, such that it has a relatively free shape.

In this pouch type lithium polymer battery (hereinafter, referred to as a "pouch type secondary battery"), a battery assembly including an anode, a separator, and a cathode is inserted into a pouch type case, and an electrolyte is injected into the pouch type case, and an edge of the pouch type case is then sealed.

Generally, the case of the pouch type secondary battery is made of a metal such as aluminum and a material coated in order prevent corrosion of the metal. When this case is subjected to a cutting process, a metal layer of the case is exposed to the outside, such that metal layer may be corroded. In addition, a local defect or a micro crack generated due to the corrosion of the metal layer at a sealing part sealed after the electrolyte is injected into the pouch type case becomes an electrical path to the outside to cause dielectric breakdown of the battery and becomes a moisture penetration path in the battery to significantly deteriorate sealing strength.

SUMMARY

An embodiment of the present invention is directed to providing a pouch type secondary battery capable of preventing corrosion of a metal layer due to exposure of the metal layer to the outside at a distal end of a case thereof, and a method for manufacturing the same.

In one general aspect, a pouch type secondary battery 100 includes: a battery assembly 20 including a plurality of electrodes; cases 10 having an internal space part in which the battery assembly 20 is received; a sealing part 11 sealed by applying a sealant 30 to a predetermined region of circumferential surfaces of the cases 10 bonded to each other so as to integrate the cases 10 with each other; and non-bonded parts 12 extended from the circumferential surfaces of the cases 10 forming the sealing part 11.

The center parts of the non-bonded parts 12 may be folded so that end portions of the non-bonded parts 12 are bonded to each other, the non-bonded parts 12 may be sealed by applying a sealant 30 to an outer side of a point at which the non-bonded parts are bonded to each other, and the sealant 30 may be a thermoplastic resin.

In another general aspect, a method for manufacturing a pouch type secondary battery includes: a primary sealing step of applying a sealant 30 to a predetermined region of circumferential surfaces of cases 10 bonded to each other so as to integrate the cases 10 with each other to perform sealing, thereby forming a sealing part 11 and non-bonded parts 12; a folding step of folding the non-bonded parts 12 toward a space therebetween to bond end portions of the non-bonded parts to each other; and a secondary sealing step of inserting the sealant 30 into a point at which the non-bonded parts 12 are folded to be bonded to each other to perform sealing.

The folding step may include a primary folding step of vertically bending the center parts of the non-bonded parts 12 toward the space between the non-bonded parts 12.

In the primary folding step, a first bending jig 210 of which both sides of one end portion are inclined symmetrically to each other so that a cross section increases may be inserted into the space between the non-bonded parts 12 to support inner side surfaces of the non-bonded parts 12.

In the primary folding step, a bar shaped pressure jig 220 may support outer side surfaces of the non-bonded parts 12, and the first bending jig 210 and the pressure jig 220 may intersect with each other so as to be in parallel with each other to vertically fold the center parts of the non-bonded parts 12.

The folding step may include a secondary folding step of folding the end portions of the non-bonded parts 12 vertically folded in the primary folding step so as to be bonded to each other.

In the secondary folding step, the first bending jig 210 and the pressure jig 220 may intersect with each other so as to be in parallel with each other, and a second bending jig 230 formed in a shape corresponding to one end portion of the first bending jig 210 may press outer side surfaces of the non-bonded parts 12 toward the first bending jig 210 to fold the end portions of the non-bonded parts 12 so as to be bonded to each other.

DETAILED DESCRIPTION OF EMBODIMENTS

Hereinafter, a technical spirit of the present invention will be described in more detail with reference to the accompanying drawings.

However, the accompanying drawings are only examples shown in order to describe the technical idea of the present invention in more detail. Therefore, the technical idea of the present invention is not limited to shapes of the accompanying drawings.

Figure 1:
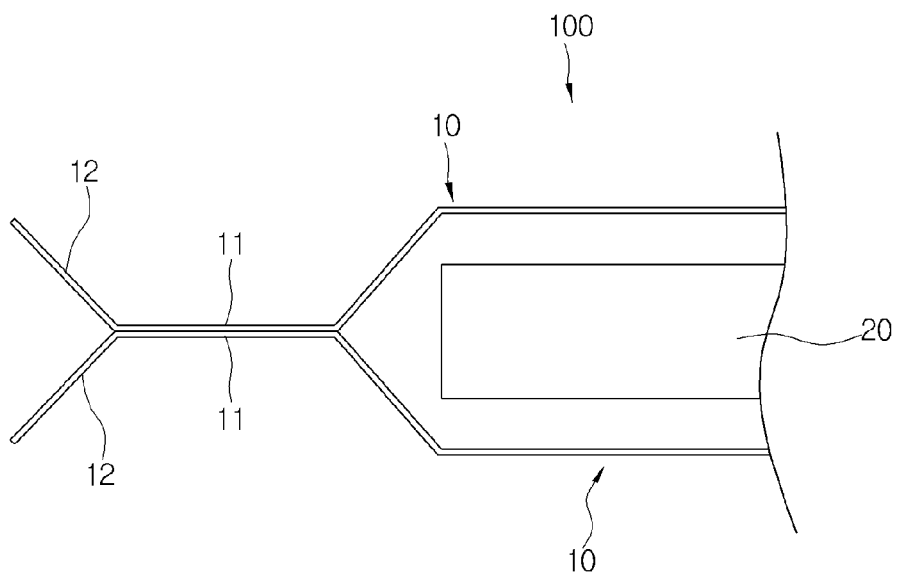
FIG. 1 is a cross-sectional view showing a primary sealing step according to an exemplary embodiment of the present invention.
Figure 2:
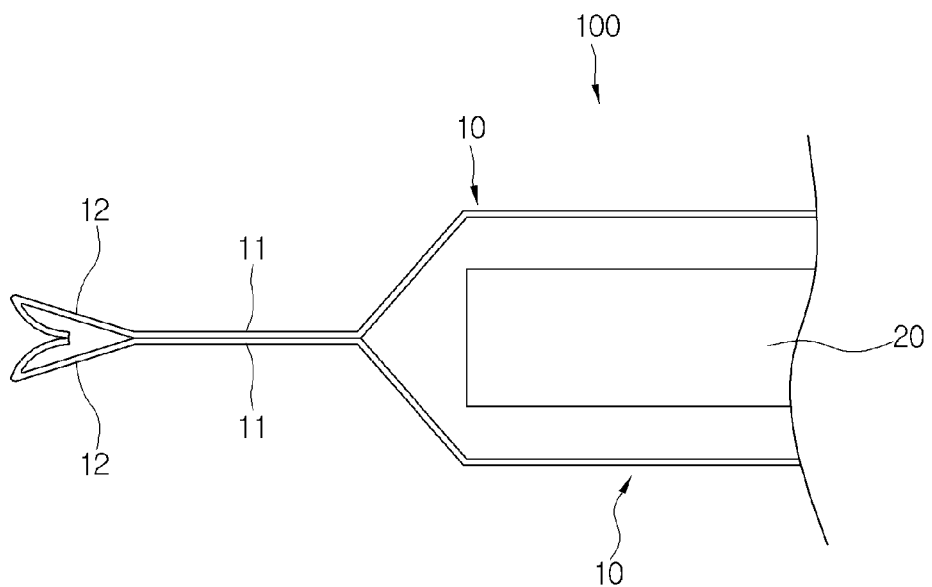
FIG. 2 is a cross-sectional view showing a folding step according to the exemplary embodiment of the present invention.
Figure 3:
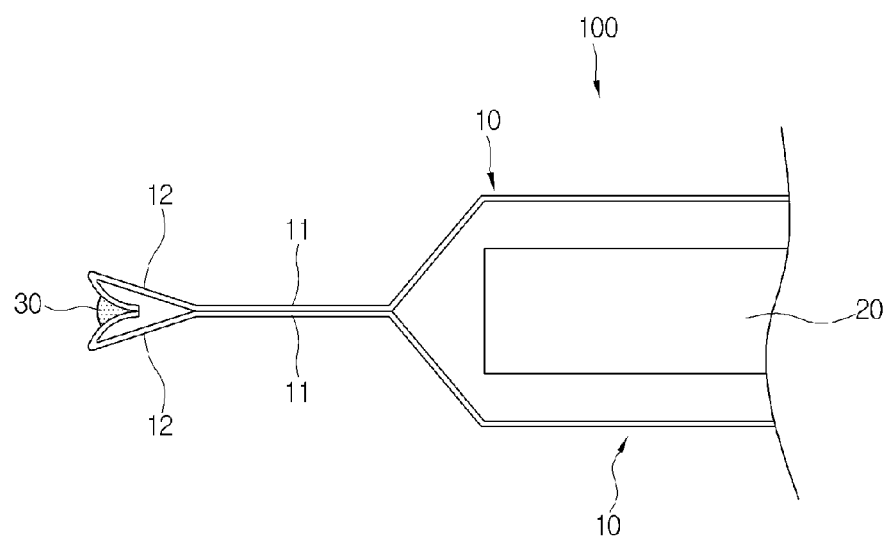
FIG. 3 is a cross-sectional view showing a secondary sealing step according to the exemplary embodiment of the present invention.
Figure 5:
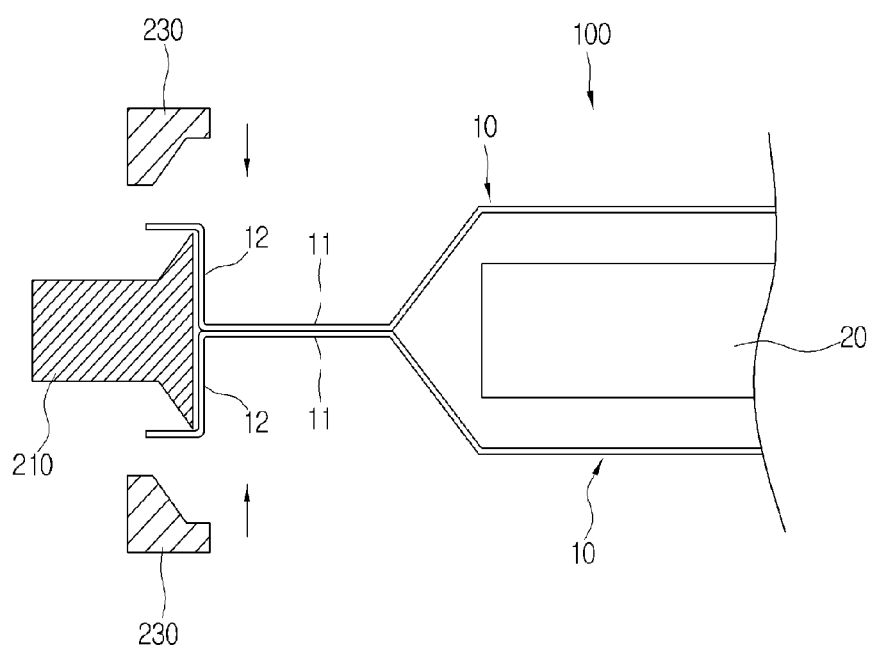
FIG. 5 is a cross-sectional view showing a process of folding the non-bonded part having the vertically bent center side in the folding step according to the exemplary embodiment of the present invention.

FIG. 1 is a cross-sectional view showing a primary sealing step according to an exemplary embodiment of the present invention; FIG. 2 is a cross-sectional view showing a folding step according to the exemplary embodiment of the present invention; FIG. 3 is a cross-sectional view showing a secondary sealing step according to the exemplary embodiment of the present invention; FIG. is a cross-sectional view showing a process of vertically bending the center side of a non-bonded part in the folding step according to the exemplary embodiment of the present invention; and FIG. 5 is a cross-sectional view showing a process of folding the non-bonded part 12 having the vertically bent center side in the folding step according to the exemplary embodiment of the present invention.

The present invention relates to a pouch type secondary battery 100 and a method for manufacturing the same, and more particularly, to a pouch type secondary battery 100 capable of preventing corrosion of a metal layer due to exposure of the metal layer to the outside at a distal end of a case thereof, and a method for manufacturing the same.

Referring to FIGS. 1 to 3, the pouch type secondary battery 100 according to an exemplary embodiment of the present invention includes a pouch type case 10, a sealing part 11 sealed so that an electrolyte injected into the case 10 is not leaked, and non-bonded parts 12 formed by extending the case 10 to an outer side of the sealing part 11, wherein sealing is performed between the non-bonded parts 12 in a state in which the non-bonded parts 12 are folded inwardly.

Referring to FIG. 1, the pouch type secondary battery 100 includes a battery assembly 20 provided in the case 10 and the electrolyte injected thereinto, wherein the battery assembly 20 includes an anode, a separator, and a cathode.

Although not shown in the accompanying drawings, the case 10 may include a metal layer made of a metal such as aluminum, wherein the metal layer may be coated in order to prevent corrosion of the metal layer. In a process of cutting the case 10 as described above, the metal layer is exposed to the outside.

In the pouch type secondary battery 100 according the exemplary embodiment of the present invention as described above, the sealing is performed one more time in a state in which the distal ends of the non-bonded parts 121 at which the metal layer included in the case 10 is exposed to the outside are folded inwardly, thereby making it possible to prevent the corrosion of the metal layer at the distal end of the case 10. Therefore, it is possible to prevent dielectric breakdown or moisture penetration due to a local defect or a micro crack generated due to the corrosion of the metal layer at the sealing part 11 and increase sealing strength.

A method for manufacturing a pouch type secondary battery 100 according to the exemplary embodiment of the present invention includes a primary sealing step, a folding step, and a secondary sealing step.

Referring to FIG. 1, in the pouch type secondary battery 100, the battery assembly 20 including the anode, the separator, and the cathode is inserted into the pouch type case 10 and the electrolyte is then injected into the pouch type case 10.

Referring to FIG. 1, in the primary sealing step of the method for manufacturing a pouch type secondary battery 100 according to the exemplary embodiment of the present invention, the sealing is performed so that the non-bonded parts 12 of the case 10 that are not bonded to each other are formed at an outer side of the sealing part 11 formed by extending the case 10 into which the electrolyte is injected so as to be long and sealed by heat and pressure.

Referring to FIG. 2, in the folding step, the non-bonded parts 12 are folded inwardly.

Although not shown in the accompanying drawings, the case 10 may include a metal layer made of a metal such as aluminum, wherein the metal layer may be coated in order to prevent corrosion of the metal layer. In a process of cutting the case 10 as described above, the metal layer is exposed to the outside. The non-bonded parts 12 are folded inwardly so that the distal end of the case 100 of which the metal layer is exposed to the outside due to the cutting as described above is directed inwardly.

Here, the metal layer may be coated with a thermoplastic resin such as polyvinyl chloride, polystyrene, polyethylene, polypropylene, acrylic, nylon, or the like. The thermoplastic resin may be softened and deformed by being again applied with heat even after being molded through of application of the heat. The heat and the pressure are applied to the cases 10 as described above, thereby making it possible to perform the sealing so that the thermoplastic resin may bond between the cases 10.

Referring to FIG. 3, in the secondary sealing step, a sealant 30 is inserted into a space between the folded non-bonded parts 12 and the heat is then applied the sealant 30 to seal between the non-bonded parts 12.

In the method for manufacturing a pouch type secondary battery 100 according the exemplary embodiment of the present invention as described above, the sealing is secondarily performed after the distal ends of the non-bonded parts 12 at which the metal layer included in the case 10 is exposed to the outside are folded inwardly, thereby making it possible to prevent the corrosion of the metal layer at the distal end of the case 10. Therefore, it is possible to prevent dielectric breakdown or moisture penetration due to a local defect or a micro crack generated due to the corrosion of the metal layer at the sealing part 11 and increase sealing strength.

The sealant 30 used in the secondary sealing step may be a thermoplastic resin.

In the secondary sealing step, since the sealant inserted between the non-bonded parts 12 is used to seal between the non-bonded parts 12 by being melted through the application of the heat, it is preferable that the thermoplastic resin capable of being softened and deformed by being again applied with the heat even after being molded through the application of the heat is used as the sealant 30.

The thermoplastic resin may be polypropylene, more specifically, a polypropylene tape capable of being easily disposed at a sealing position so that the polypropylene is not out of the sealing position in a sealing process.

Figure 4:
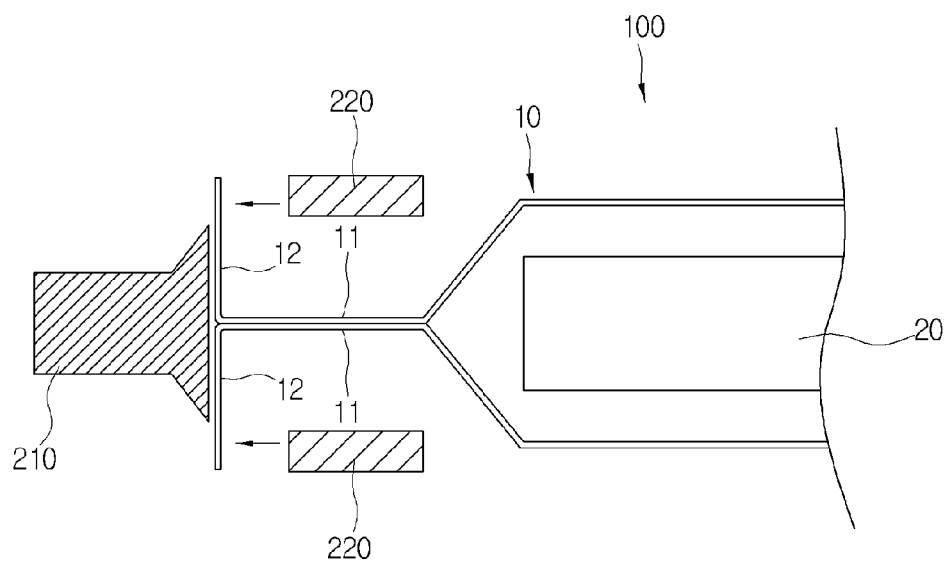
FIG. 4 is a cross-sectional view showing a process of vertically bending the center side of a non-bonded part in the folding step according to the exemplary embodiment of the present invention.

Referring to FIG. 4, the folding step may include a process of vertically bending the center side of the non-bonded part 12. Since the case 10 of the pouch type secondary battery 100 includes the metal layer, it is not easy to fold the case 10 by a single process. Therefore, it is preferable that the folding step includes the process of bending the center side of the non-bonded part 12 so as to be vertical to an inward direction.

In the folding step, the non-bonded part 12 may be folded by a first bending jig 210 of which both side surfaces of one end portion are inclined symmetrically to each other so that an area increases, a pressure jig 220, and a second bending jig 230 formed at one end portion of the first bending jig 210 so as to correspond to the first bending jig 210.

Referring to FIGS. 4 and 5, the first bending jig 210 supports an inner side surface of the non-bonded part, the pressure jig 220 intersects with the first bending jig 210 so as to be in parallel with the first bending jig 210 while pressing an outer side surface of the non-bonded part 12, such that the center side of the non-bonded part 12 is vertically bent, and the second bending jig 230 then presses the outer side surface of the non-bonded part 12, thereby making it possible to easily fold the non-bonded part 12.

With the pouch type secondary battery 100 and the method for manufacturing the same as described above, the corrosion of the metal layer generated due to the exposure of the metal layer to the outside at the distal end of the case 10 of the pouch type secondary battery 100 is prevented, thereby making it possible to prevent the dielectric breakdown of the pouch type secondary battery 100 or the moisture penetration due to the local defect or the micro crack of the metal layer generated at the sealing part 11 and increase the sealing strength.

Hereinafter, the pouch type secondary battery and the method for manufacturing the same according to the exemplary embodiment of the present invention as described above will be described with reference to the accompanying drawings.

Referring to FIG. 1, the battery assembly 20 is inserted into the case 10 of the pouch type secondary battery 100, the electrolyte is injected into the case 100, and the heat and the pressure are the applied thereto so that the non-bonded parts 12 are formed at the outer side of the sealing part 11, thereby performing the primary sealing.

Next, one cross section of the first bending jig 210 having a wide area contacts the inner side surface of the non-bonded part 12. Referring to FIG. 4, the outer side surface of the non-bonded part at a portion that does not contact the one cross section of the first bending jig 210 is pressed using the pressure jig 220 to bend the center side of the non-bonded part 12 so as to be vertical to the inward direction. Here, the first bending jig 210 and the pressure jig 220 intersect with each other so as to be parallel with each other.

Referring to FIG. 5, when the center side of the non-bonded part 12 is vertically bent, the outer side surface of the non-bonded part 12 is pressed using the second bending jig 230 formed corresponding one end portion of the first bending jig 210 so that the non-bonded part 12 is folded.

The distal end of the non-bonded part 12 subjected to the primary sealing step is folded inwardly as shown in FIG. 2 through the above-mentioned process.

Next, as shown in FIG. 3, the sealant 30 is inserted between the folded non-bonded parts 12 and the heat is applied to the sealant 30 to seal between the non-bonded parts 12.

As set forth above, with the pouch type secondary battery and the method for manufacturing the same according to the exemplary embodiment of the present invention, the corrosion of the metal layer generated due to the exposure of the metal layer to the outside at the distal end of the case of the pouch type secondary battery 100 is prevented, thereby making it possible to prevent the dielectric breakdown of the pouch type secondary battery or the moisture penetration due to the local defect or the micro crack of the metal layer generated at the sealing part and increase the sealing strength.

The present invention is not limited to the above-mentioned exemplary embodiments, and may be variously applied, and may be variously modified without departing from the gist of the present invention claimed in the claims.

What is claimed is:

1. A method for manufacturing a pouch type secondary battery, the method comprising: a primary sealing step of applying a sealant to a predetermined region of circumferential surfaces of cases bonded to each other so as to integrate the cases with each other to perform sealing, thereby forming a sealing part and non-bonded parts; a folding step of folding the non-bonded parts toward a space therebetween to bond end portions of the non-bonded parts to each other; and a secondary sealing step of inserting the sealant into a point at which the non-bonded parts are folded to be bonded to each other to perform sealing; wherein the folding step includes a primary folding step of vertically bending the center parts of the non-bonded parts toward the space between the non-bonded parts; wherein in the primary folding step, a first bending jig of which both sides of one end portion are inclined symmetrically to each other so that a cross section increases is inserted into the space between the non-bonded parts to support inner side surfaces of the non-bonded parts.

2. The method of claim 1, wherein in the primary folding step, a bar shaped pressure jig supports outer side surfaces of the non-bonded parts, and the first bending jig and the pressure jig intersect with each other so as to be in parallel with each other to vertically fold the center parts of the non-bonded parts.

3. The method of claim 1, wherein the folding step includes a secondary folding step of folding the end portions of the non-bonded parts vertically folded in the primary folding step so as to be bonded to each other.

4. The method of claim 3, wherein in the secondary folding step, the first bending jig and the pressure jig intersect with each other so as to be in parallel with each other, and a second bending jig formed in a shape corresponding to one end portion of the first bending jig presses outer side surfaces of the non-bonded parts toward the first bending jig to fold the end portions of the non-bonded parts so as to be bonded to each other.

* * * * *